(12) United States Patent
Iudica et al.

(10) Patent No.: US 12,409,772 B2
(45) Date of Patent: Sep. 9, 2025

(54) METHOD FOR IMPROVED SURROUNDINGS DETECTION

(71) Applicant: Continental Automotive GmbH, Hannover (DE)

(72) Inventors: Martin Iudica, Frankfurt am Main (DE); Sebastien Reisinger, Hamm am Rhein (DE); Ahmed Abdeldaym, Frankfurt am Main (DE); Frank Edling, Schwalbach (DE)

(73) Assignee: Continental Autonomous Mobility Germany GmbH, Auburn Hills, MI (US)

( * ) Notice: Subject to any disclaimer, the term of this patent is extended or adjusted under 35 U.S.C. 154(b) by 1006 days.

(21) Appl. No.: 17/027,099

(22) Filed: Sep. 21, 2020

(65) Prior Publication Data

US 2021/0086687 A1 Mar. 25, 2021

(30) Foreign Application Priority Data

Sep. 20, 2019 (DE) ...................... 10 2019 214 319.9

(51) Int. Cl.
*B60Q 1/08* (2006.01)
*B60Q 1/00* (2006.01)
(Continued)

(52) U.S. Cl.
CPC ........... *B60Q 1/085* (2013.01); *B60Q 1/0023* (2013.01); *G01S 7/4802* (2013.01); *G01S 13/865* (2013.01);
(Continued)

(58) Field of Classification Search
CPC ..... B60Q 1/085; B60Q 1/0023; G01S 7/4802; G01S 13/865; G01S 17/931; G06T 7/11; G06V 20/56
(Continued)

(56) References Cited

U.S. PATENT DOCUMENTS 8,044,789 B2 * 10/2011 Daura Luna .......... G01S 17/931
348/148
10,222,474 B1 * 3/2019 Raring ................ H01S 5/02212
(Continued)

FOREIGN PATENT DOCUMENTS

CN 107000752 A 8/2017
CN 111386701 A 7/2020
(Continued)

OTHER PUBLICATIONS

German Search Report dated Jul. 23, 2020 for corresponding German Patent Application No. 10 2019 214 319.9.
(Continued)

*Primary Examiner* — Krishnan Ramesh

(57) ABSTRACT

A method for improved surroundings detection utilizing an optical sensor of a vehicle. The method includes detecting the surroundings of the vehicle and compiling a first surroundings model based on sensor data of the surroundings detecting sensor. The method also includes determining regions having low quality in the surroundings model by evaluating optical sensor data with an image evaluation device. The detectability of the regions having low quality are improved by taking a selected measure. The method also includes detecting the surroundings of the vehicle again with the optical sensor and comparing the sensor data of the optical sensor after taking the measure with the sensor data of the optical sensor prior to taking the measure. The sensor data following the measure is fused with the already existing sensor data in order to compile a second surroundings model.

22 Claims, 1 Drawing Sheet

(51) Int. Cl.
  *G01S 7/48* (2006.01)
  *G01S 13/86* (2006.01)
  *G01S 17/931* (2020.01)
  *G06T 7/11* (2017.01)
  *G06V 20/56* (2022.01)

(52) U.S. Cl.
  CPC .............. *G01S 17/931* (2020.01); *G06T 7/11* (2017.01); *G06V 20/56* (2022.01)

(58) Field of Classification Search
  USPC ........................................................... 701/36
  See application file for complete search history.

(56) References Cited

U.S. PATENT DOCUMENTS

| | | | |
|---|---|---|---|
| 11,748,991 B1* | 9/2023 | Day | H04N 23/69 |
| | | | 348/143 |
| 2017/0124781 A1* | 5/2017 | Douillard | G08G 1/207 |
| 2017/0327231 A1* | 11/2017 | Beckman | B60Q 3/47 |
| 2018/0165833 A1* | 6/2018 | Inoue | H04N 17/002 |
| 2018/0194282 A1* | 7/2018 | Wolterman | G08G 1/096791 |
| 2019/0108410 A1* | 4/2019 | Zhang | G06V 20/582 |
| 2019/0162381 A1* | 5/2019 | Estes | F21S 41/176 |
| 2020/0193686 A1* | 6/2020 | Chong | G06T 7/70 |
| 2020/0284913 A1* | 9/2020 | Amelot | G01S 7/4808 |
| 2020/0410274 A1* | 12/2020 | Satoh | G06T 11/00 |
| 2021/0073646 A1* | 3/2021 | Junginger | G06V 20/56 |
| 2021/0232842 A1* | 7/2021 | Yamamoto | G08G 1/166 |

FOREIGN PATENT DOCUMENTS

| | | |
|---|---|---|
| DE | 102006041857 A1 | 4/2007 |
| DE | 102010015731 | 4/2007 |
| DE | 102010033387 A1 | 3/2011 |
| DE | 102011017644 A1 | 10/2012 |
| DE | 102013002212 A1 | 8/2014 |
| DE | 102017206247 A1 | 10/2018 |
| JP | 2000318513 A | 11/2000 |
| JP | 2006290273 A | 10/2006 |
| JP | 2016169001 A | 9/2016 |
| WO | 03008232 A1 | 1/2003 |
| WO | 2019111464 A1 | 6/2019 |

OTHER PUBLICATIONS

Notice of Reasons for Refusal drafted on May 28, 2024 for the counterpart Japanese Patent Application No. 2020-148739 and machine translation of same.
Chinese First Office Action dated Oct. 26, 2024 for the counterpart Chinese Patent Application 202010991506.9 and machine translation of same.
Chinese Office Decision dated Feb. 14, 2025 for the counterpart Chinese Patent Application 202010991506.9 and machine translation of same.

* cited by examiner

METHOD FOR IMPROVED SURROUNDINGS DETECTION

CROSS REFERENCE TO RELATED APPLICATION

This application is a claims priority to German Application DE 10 2019 214 319.9, filed Sep. 20, 2019, which is hereby incorporated by reference.

TECHNICAL FIELD

The technical field relates generally to detecting the surroundings of a vehicle.

BACKGROUND

Systems which calculate a surroundings model from various sensor and map data are known from the prior art. Furthermore, concepts are to be found for systems which check the plausibility of said surroundings model with the aid of external sources (other vehicles, infrastructure objects, Car-2-X) or which extend it in spatially restricted (static) regions.

The current prior art makes it possible to check the plausibility of properties of the surroundings which have already been recognized by the target vehicle (ego-vehicle) or respectively to extend the accuracy thereof If the detection ranges of the sensors have gaps or uncertainties due to the current surroundings situation, it is not possible for the ego-vehicle to minimize the gaps or uncertainties independently, according to the current prior art.

As such, it is desirable to present a method for improved surroundings detection and, as a consequence, to increase the quality of a compiled surroundings model. In addition, other desirable features and characteristics will become apparent from the subsequent summary and detailed description, and the appended claims, taken in conjunction with the accompanying drawings and this background.

SUMMARY

For (highly) automated vehicles, the surroundings model constitutes the framework in which vehicle movements (trajectories) can be planned. It was established during the initial considerations which form the basis of this disclosure, that if the surroundings model has shortcomings due to the current circumstances (insufficiently illuminated roadway regions, prediction horizon smaller than required for safe trajectory planning due to the sensor range), the (highly) automated vehicle can only calculate a reduced number of possible vehicle trajectories, which increases the probability of not being able to supply an ideal or respectively sufficiently convenient or safe trajectory through the real vehicle surroundings. Consequently, one of the objectives was to make it possible to extend the coverage and quality of the vehicle surroundings such that a greater conformity of the surroundings model with the real vehicle surroundings is produced, compared with the known prior art and, as a result, the probability of finding a sufficiently convenient or respectively sufficiently safe trajectory is appreciably increased.

According to one embodiment, a method for improved surroundings detection with at least one first surroundings detecting sensor of a vehicle is accordingly proposed, wherein the first surroundings detecting sensor is an optical sensor, the method including:

detecting the surroundings of the vehicle by means of the at least one first surroundings detecting sensor,
compiling a first surroundings model based on sensor data of the first surroundings detecting sensor,
determining regions having low quality in the surroundings model by evaluating optical sensor data by means of an image evaluation device,
improving the detectability of the regions having low quality by taking a selected measure,
detecting the surroundings of the vehicle again with at least one optical sensor,
comparing the sensor data of the optical sensor after taking the measure with the sensor data of the optical sensor prior to taking the measure, and
fusing the sensor data following the measure with already existing sensor data of the at least one first surroundings detecting sensor in order to compile a second surroundings model.

Determining regions having low quality is advantageous, since these regions lead to uncertainties and inaccuracies in the surroundings model, which is disadvantageous for trajectory planning. Based on the determination of these regions, measures or respectively at least one measure can be taken which improve(s) the detectability of said regions. This is advantageous in order to reduce the uncertainties or respectively inaccuracies and, consequently, increase the quality of the surroundings model.

When the detectability of the regions having low quality is improved, the detectability by the optical sensor is in particular improved.

During the fusing, the objects, which are detected by the optical sensor following the measure, are therefore fused with the existing objects in the surroundings model.

It would also be conceivable to fuse a surroundings model from two sensors. Here, a radar, lidar, or an ultrasonic sensor could be used as a second sensor. When using a second sensor, the sensor data can, for example, be fused following the measure with the sensor data of the second surroundings detecting sensor, as a result of which an even more accurate surroundings model is generated and, consequently, the quality of the surroundings model can be further improved.

In one embodiment, the measure comprises illuminating the regions having low quality. In light of this disclosure, the term "illumination" not only denotes lighting a region with a light in the visible range, but equally lighting said region with invisible light or respectively lighting said region with varying wavelengths. The lighting with invisible light may be performed first. This is advantageous since, in this way, the driver is not irritated or respectively distracted by the lighting.

At least one lighting device of the vehicle may be actuated for illuminating the regions having low quality.

In a further embodiment, the at least one lighting device comprises a headlight, high beam, a fog light, matrix light, laser light, an infrared light source and/or an additional light source fixed to the vehicle. The additional light source can, for example, output light outside the visible range. In general, all of the indicated light sources are mounted in the vehicle such that the latter output light in the detection range of at least one of the optical sensors mounted in the vehicle.

By deliberately switching on or turning the headlamps (headlights) on full, and the fog lights, parts of the detection range of forward-facing optical sensors are deliberately illuminated. In situations in which the contrast conditions contain insufficient information in natural lighting, additional information regarding the surroundings conditions and object distances are obtained as a result.

According to the current prior art, no provision is made for the use of light sources permanently installed in the vehicle for actively and adequately illuminating the vehicle surroundings. By actively actuating the installed light sources and the associated actuators, poorly lit areas in the detection range of the optical sensors are deliberately illuminated without additional hardware outlay. Obstacles are recognized earlier, previously poorly illuminated regions can be utilized for trajectory planning and, thanks to the use of already installed light sources, existing systems can also be extended by the described functions.

In a further embodiment, the additional light source is a light source which is configured to emit light in a selectable frequency, wherein, due to the special frequency, certain objects having known reflection characteristics are highlighted in the detected surroundings.

By utilizing different frequencies or respectively wavelengths in the active surroundings lighting, it is additionally possible to draw conclusions about the type of road and the condition of the road. To this end, the surroundings are lit in a pulsed manner at fixed intervals with defined wavelengths, for example IR or UV, and with the aid of image sensors having suitable filters for these wavelengths, a separate image is in each case detected for each wavelength. Additional image or respectively contrast information can be obtained by alternating pulsating actuation or respectively lighting in a pulsed manner in various wavelengths and subsequent fusion of the images, as a result of which road and lane boundaries can be more clearly demarcated and information can then also be extracted from sensor images, if the sensor in the range of visible light is dazzled, for example by oncoming traffic.

Contrast differences emerge differently in the case of light of another frequency or respectively wavelength or another composition of wavelengths to that in standard headlight light or natural light. For example, a "light gray road delimited by light gray concrete barriers" scene can have hardly any contrast in natural lighting, but can show a strong contrast in IR lighting.

By utilizing active lighting or respectively actuation in a pulsating/pulse-like manner of installed lighting means, sudden road transitions such as, for example, potholes, construction trenches, jumps in friction coefficients, road borders, missing roadway, harbor basins, etc., can be better recognized on the basis of the reflection behavior, and can be considered in the surroundings model.

It would also be conceivable for the pigments utilized in the lane markings and the reflective behavior thereof to be considered and, for that reason, lighting means having wavelengths adapted to the pigments to be installed in the vehicle. This makes it possible to particularly highlight the lane and road markings for the optical sensors and to recognize different types of markings (regular, white markings; yellow construction site markings and generally different colors) by means of pulsating actuation or respectively pulse-like lighting. In addition, it would be possible to define specific road markings for automated vehicles which exhibit certain reflection behaviors which are only visible to the cameras of the (highly) automated vehicle having the appropriate lighting means. As a result, individual streets or lanes could be specially prepared for (highly) automated vehicles, without a human driver having to adjust himself to these altered or respectively additional markings. This would also be possible without special color pigments by selecting the corresponding wavelength or respectively frequency for yellow light, for example for yellow markings. In this way, the yellow line appears brighter in the camera image.

Following the comparison of the sensor data, it may be checked whether further regions having low quality exist. The aim of this is to check whether the measure was sufficient and the regions having low quality, which were previously difficult to recognize, now have a higher quality. Further regions having low quality can either denote new regions or the regions having low quality which have already previously been recognized.

If further regions having low quality exist, the selected measure may be repeated. It would also be conceivable, if further regions having low quality exist or respectively if the same regions still have a low quality, for another measure to be initiated. For example, data regarding said regions could be called up from the infrastructure or other road users.

Contrasts, illumination of the detection range, wavelength of the detected light and/or distribution of the different detected wavelengths over the detection range are particularly analyzed, in order to assess the quality of the optical sensor data. Said analysis is advantageous, since it can be established in this way which type of illumination or respectively in general which measure is suitable for improving the detectability of the regions having low quality.

Furthermore, a system for use in a vehicle is proposed, wherein the system is suitable for performing the methods described herein, comprising at least one first and one second surroundings detecting sensor, wherein the first surroundings detecting sensor is an optical sensor and the second surroundings detecting sensor is a radar, lidar or ultrasonic sensor for detecting the surroundings of a vehicle, an image evaluation device for evaluating and comparing optical sensor data, at least one actuator for actuating at least one lighting device and a computing unit for compiling a surroundings model and for fusing sensor data. The computing unit further predefines the parameters of how the lighting device has to be actuated by means of the actuator, in order to deliberately illuminate the corresponding regions.

BRIEF DESCRIPTION OF THE DRAWINGS

Further advantageous configurations are set out in the drawings, wherein.

DETAILED DESCRIPTION

Figure 1:
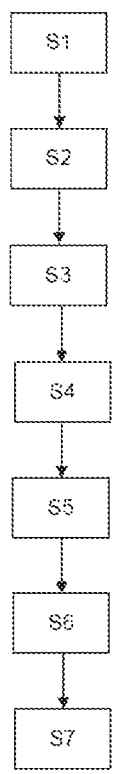
FIG. 1 shows a schematic flow chart of an exemplary embodiment of the method.

FIG. 1 shows a schematic flow chart of an embodiment of a method for improved surroundings detection by utilizing at least one first surroundings detecting sensor of a vehicle, wherein the first surroundings detecting sensor is an optical sensor. In step S1, the surroundings of the vehicle are detected with the at least one first surroundings detecting sensor. In step S2, a first surroundings model is compiled based on sensor data of the at least one first surroundings detecting sensor. In a subsequent step S3, regions having low quality in the surroundings model are determined by evaluating optical sensor data by means of an image evaluation device. In step S4, the detectability of the regions having low quality is improved by taking a selected measure. In a next step S5, the surroundings of the vehicle are detected again with at least the optical sensor. Thereupon, in step S6, the sensor data of the optical sensor after taking the measure are compared with the sensor data of the optical sensor prior to taking the measure. To conclude, the sensor data following the measure are fused with already existing sensor data of the at least one first surroundings detecting sensor in step S7, in order to compile a second surroundings model.

Figure 2:
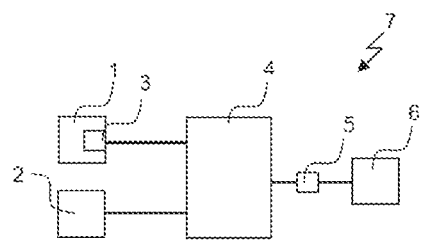
FIG. 2 shows a schematic view of a system according to an exemplary embodiment.

FIG. 2 shows a schematic view of a system 7 according to an embodiment. The system 7 is provided for use in a vehicle, wherein the system is suitable for performing the method according to the invention, comprising at least one first 1 and one second surroundings detecting sensor 2, wherein the first surroundings detecting sensor 1 is an optical sensor and the second surroundings detecting sensor 2 is a radar, lidar or ultrasonic sensor, for detecting the surroundings of a vehicle, an image evaluation device 3 for evaluating and comparing optical sensor data, at least one actuator 5 for actuating at least one lighting device 6 and a computing unit 4 for compiling a surroundings model and for fusing sensor data.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method for improved surroundings detection of a vehicle and use thereof, the method comprising:
   detecting surroundings of the vehicle with at least one first surroundings detecting sensor, wherein the at least one first surroundings detecting sensor is at least one optical sensor,
   compiling a first surroundings model based on sensor data of the at least one optical sensor,
   determining regions having low quality in the surroundings model by evaluating optical sensor data utilizing image evaluation,
   improving the detectability of the regions having low quality by taking a selected measure to affect the surroundings of the vehicle,
   detecting the surroundings of the vehicle again with the at least one optical sensor,
   comparing the sensor data of the at least one optical sensor after taking the measure with the sensor data of the at least one optical sensor prior to taking the measure, and
   fusing the sensor data following the selected measure with sensor data of the first surroundings model in order to compile a second surroundings model,
   wherein taking the selected measure comprises selecting a wavelength or a frequency of light from a plurality of wavelengths or frequencies, and illuminating the regions having low quality with light at the selected wavelength or frequency, and
   wherein taking the selected measure further comprises illuminating the regions having low quality in a pulsed, alternating manner at fixed intervals with a plurality of defined wavelengths.

2. The method according to claim 1, wherein at least one lighting device of the vehicle is actuated for illuminating the regions having low quality.

3. The method according to claim 2, wherein the at least one lighting device comprises a headlight, a fog light, an infrared light source, and/or an additional light source fixed to the vehicle.

4. The method according to claim 3, wherein the additional light source is a light source which is configured to emit light at the selected frequency or wavelength, wherein, due to the selected frequency or wavelength, certain objects having known reflection characteristics are highlighted in the detected surroundings.

5. The method according to claim 1, further comprising checking whether further regions having low quality exist following the comparison of the sensor data.

6. The method according to claim 5, further comprising repeating or applying the selected measure in a modified manner if further regions having low quality exist.

7. The method according to claim 1, further comprising evaluating a quality of the sensor data of the at least one optical sensor by analyzing at least one of contrasts or an exceeding a minimum gray-scale value threshold in the sensor data.

8. The method according to claim 1, wherein selecting the wavelength or frequency is based on at least one object representation in the optical sensor data.

9. The method according to claim 8, wherein the at least one object comprises at least one of a road segment or a painted line segment of a road segment.

10. The method according to claim 1, further comprising planning movement of the vehicle based on the second surroundings model.

11. A system for use in a vehicle, comprising:
    at least one optical sensor for detecting the surroundings of a vehicle;
    a computer configured to compile a surroundings model based on the data from the at least one optical sensor;
    an image evaluation device configured to evaluate and compare the optical sensor data to determine regions having low quality in the surroundings model;
    the computer is further configured for selecting a wavelength or a frequency of light from a plurality of wavelengths or frequencies; and
    at least one actuator configured to actuate at least one lighting device to improve the detectability of the surroundings which correspond to the regions having low quality by illuminating the regions having low quality with light at the selected wavelength or selected frequency;
    wherein the computer is further configured to fuse sensor data following the actuation of the at least one lighting device with sensor data of the surroundings model in order to compile a second surroundings model, and
    wherein taking the selected measure further comprises illuminating the regions having low quality in a pulsed, alternating manner at fixed intervals with a plurality of defined wavelengths.

12. The system according to claim 11, wherein the at least one lighting device comprises a headlight, a fog light, an infrared light source, and/or an additional light source fixed to the vehicle.

13. The system according to claim 12, wherein the additional light source is a light source which is configured to emit light at the selected frequency or wavelength, wherein, due to the selected frequency or wavelength, certain objects having known reflection characteristics are highlighted in the detected surroundings.

14. The system according to claim 11, wherein the evaluation device is further configured to check whether further regions having low quality exist following the comparison of the sensor data.

15. The system according to claim 11, wherein the computer is further configured for repeating or applying the selected measure in a modified manner if further regions having low quality exist.

16. The system according to claim 11, wherein the computer or the image evaluation device is configured for evaluating the quality of the optical sensor data by analyzing contrasts or an exceeding of a minimum gray-scale value threshold in the image region.

17. The system according to claim 11, wherein the wavelength or frequency selected is based on at least one object representation in the optical sensor data.

18. The system according to claim 17, wherein the at least one object comprises at least one of a road segment or a painted line segment of a road segment.

19. The system according to claim 11, further comprising evaluating a quality of the sensor data of the at least one optical sensor by analyzing at least one of contrasts or an exceeding a minimum gray-scale value threshold in the sensor data.

20. The system according to claim 11, wherein the computer is further configured to plan movement of the vehicle based on the second surroundings model.

21. A method for improved surroundings detection of a vehicle and use thereof, the method comprising:
    detecting, by a computer, surroundings of the vehicle with at least one first surroundings detecting sensor, wherein the at least one first surroundings detecting sensor is at least one optical sensor,
    compiling a first surroundings model based on sensor data of the at least one optical sensor,
    determining regions having low quality in the surroundings model by evaluating optical sensor data utilizing image evaluation,
    improving the detectability of the regions having low quality by taking a selected measure to affect the surroundings of the vehicle,
    detecting the surroundings of the vehicle again with the at least one optical sensor,
    comparing the sensor data of the at least one optical sensor after taking the selected measure with the sensor data of the at least one optical sensor prior to taking the selected measure, and
    fusing the sensor data following taking the selecting measure with sensor data of the first surroundings model in order to compile a second surroundings model,
    wherein taking the selected measure comprises illuminating the regions having low quality in a pulsed manner at fixed intervals with a plurality of defined wavelengths.

22. The method according to claim 21, wherein illuminating the regions having low quality in a pulsed manner comprises illuminating with alternating pulse actuation by one or more light sources.

* * * * *